(Model.)

C. C. CANNOM.
DISH DRAINER.

No. 363,045. Patented May 17, 1887.

WITNESSES
W. Webb
Wesley Webb

INVENTOR
Charlotte C. Cannom
per Henry Beech
atty.

N. PETERS, Photo-Lithographer, Washington, D. C.

(Model.)

C. C. CANNOM.
DISH DRAINER.

No. 363,045.

2 Sheets—Sheet 2.

Patented May 17, 1887.

WITNESSES
W. Webb
Wesley Webb

INVENTOR
Charlotte C. Cannom
by Henry Beech
atty.

UNITED STATES PATENT OFFICE.

CHARLOTTE C. CANNOM, OF LONDON, ONTARIO, CANADA.

DISH-DRAINER.

SPECIFICATION forming part of Letters Patent No. 363,045, dated May 17, 1887.

Application filed September 19, 1885. Serial No. 177,608. (Model.)

*To all whom it may concern:*

Be it known that I, CHARLOTTE C. CANNOM, a subject of the Queen of Great Britain, residing at London, in the county of Middlesex, and Province of Ontario, Dominion of Canada, have invented a new and useful improvement in Dish-Drainers for Receiving and Draining China, Glassware, Cutlery, &c.; and I do hereby declare that the following is a full, clear, and exact description of the same.

My invention consists of a wire basket fitted with springs constructed and arranged as hereinafter set forth for holding plates, dishes, bowls, cups and saucers, cutlery, &c. It is intended to be used in the removal of articles from the table, and is so arranged that the several pieces may be drained and washed in the basket.

Figure 1:
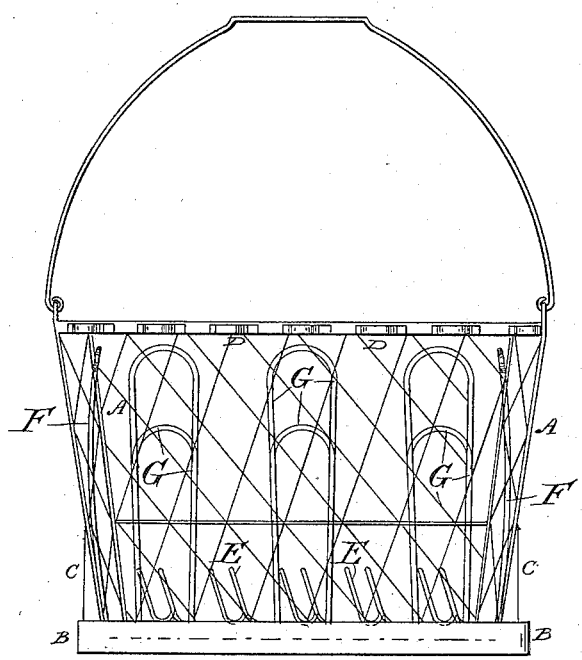
Figure 2:
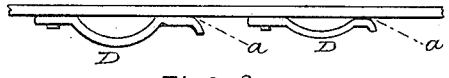
Figure 3:
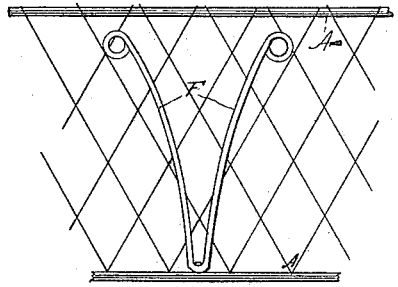
Figure 4:
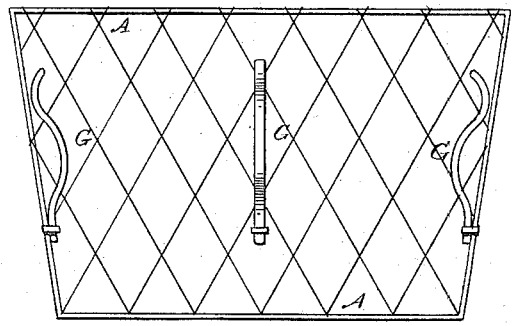
Figure 5:
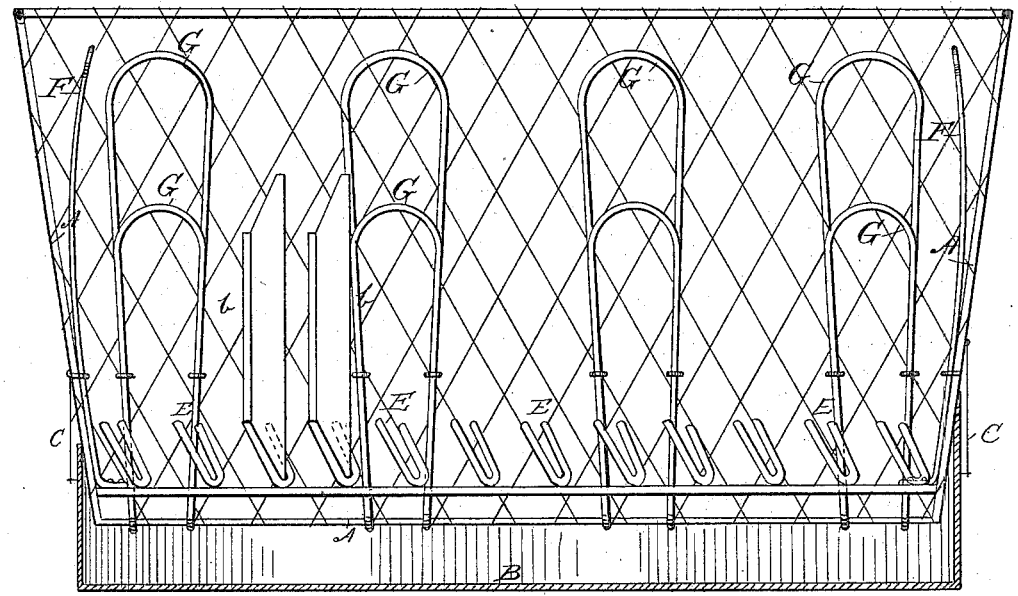
Figure 6:
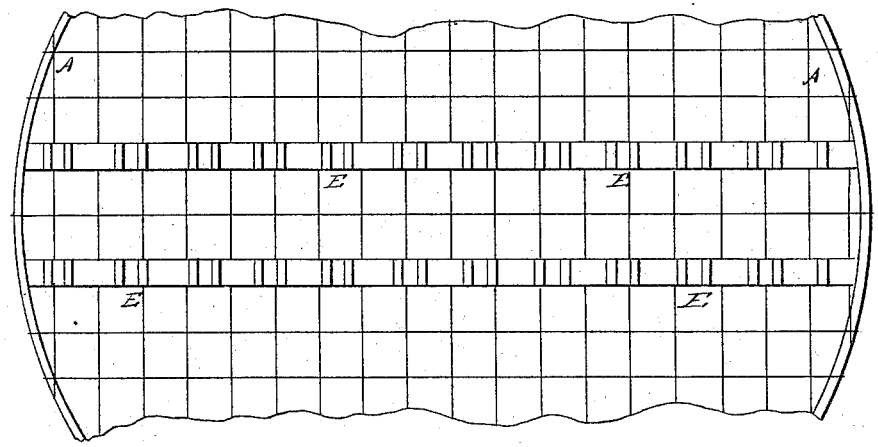

In the accompanying drawings, Figure 1 is a side view of the basket. Fig. 2 is a plan of springs attached to the basket-rim for the purpose of holding cups and other articles. Fig. 3 is a partial end view of the basket with spring adapted to hold jugs and like articles. Fig. 4 is a view of the basket provided with springs for holding bowls. Fig. 5 is an enlarged longitudinal section of the basket and pan, with modified form of springs for holding bowls, and showing also springs for holding plates and dishes. Fig. 6 is a partial plan view of the basket, showing the parallel rows of springs for holding dishes and plates.

A is the basket, made of wire, of any desired size and pattern.

B is a shallow tin dish in which the basket stands, and is attached to the sides thereof by wires C, or other suitable means. This dish will receive the drippings, &c., from the plates, &c., in the basket.

D D are springs made of steel or iron wire, and either flat or round, attached to or near the rim of the basket, either on the inside or outside. These springs are so shaped as to allow of cups, knives, forks, spoons, &c., being suspended therefrom after being inserted at close ends $a$. In the bottom of the basket a double row of flat or round upright springs, E, will be attached, to hold plates, saucers, &c., in an upright position between each pair of springs, so that on removing those articles from the table they will be deposited severally between the springs and carried in this manner away and washed without removal from the basket. These springs E are U-shaped and placed in a vertically-inclined position, in parallel lines or rows, as shown in Fig. 6, so as to grasp the rims of the plates or dishes more readily and hold them in an upright position. Other springs, F, shaped substantially as shown at Fig. 3, will be affixed to bottom of basket to hold jugs, &c., inverted upon them, and other springs, G, will project from sides of basket to hold bowls, &c. These springs G may be shaped either as shown in Fig. 4 or as shown in Figs. 1 and 5. The table-service will be thus deposited severally in or on the spring attachments of basket. The pan B beneath catches the drippings. The whole at conclusion of the meal will be carried to the kitchen and washed by depositing in a pan of water and without removal from basket.

I claim as my invention—

The herein-described wire basket and dish-drainer, provided with springs D, attached to the basket-rim, a double row of inclined U-shaped springs, E, arranged in an inclined position in the bottom of the basket, upright springs F, attached within the basket at each end, and upright springs G, secured in each side of the basket, all of said springs being adapted to secure articles of table-ware, substantially as described.

CHARLOTTE C. CANNOM. [L. S.]

Witnesses:
RICHARD HAYLY,
HENRY BEECH.